March 5, 1968  A. H. RIOT  3,371,699
GAS BURNER WITH PROPORTIONAL MIXER
Filed June 23, 1966

United States Patent Office 3,371,699
Patented Mar. 5, 1968

3,371,699
GAS BURNER WITH PROPORTIONAL MIXER
André Henri Riot, Pamiers, France, assignor to Societe Metallurgique d'Imphy, Paris, France, a company of France
Filed June 23, 1966, Ser. No. 559,807
Claims priority, application France, July 5, 1965, 23,488
2 Claims. (Cl. 158—119)

The invention relates to a gas burner, for instance, for natural gas, of use more particularly for heating metallurgical furnaces.

It is an object of the invention to maintain a constant air-to-gas proportion over a range of burner operating conditions.

It is another object of the invention to provide good mixing of the gas and air.

These two conditions lead to very high combustion efficiency and hence to full use of the heating value of the gas.

Another object of the invention is to provide a constant air-to-gas proportion in all furnace operating conditions without having to depend upon the vigilance of the furnace operating staff, the constancy being provided automatically by the heating equipment.

Conventional gas burners cannot automatically ensure a constant air-to-gas relationship at different burner operating conditions.

The burner according to the invention can provide such operating conditions and is distinguished in that it comprises a portion pierced with orifices, some for gas flow and the others for air flow, the gas and air pressure being equal before such portion, the gas and air orifices being calculated to ensure a desired air-to-gas relationship after such portion. Preferably, the orifices are cylindrical holes which are all of the same diameter as one another. The invention makes the relationship between hole cross-section and fluid-swept surface identical for all the orifices, whether air or gas, with the result of a constant air-to-gas ratio in all operating conditions, load losses varying very similarly for the air and the gas.

The invention will now be described in greater detail with reference to an exemplary embodiment shown in the drawings.

Other features of the invention will be disclosed by the following description.

The heating system can of course comprise a number of burners each providing the required proportionality between the rates of gas and air flow. The following description relates just to a single burner, but the invention of course covers the case of a number of burners being provided in a single installation.

Figure 1:
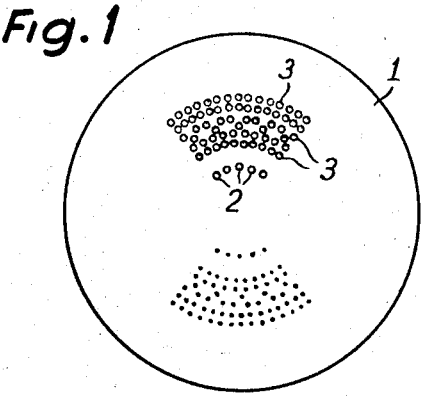
FIGURE 1 is a diagrammatic view of a perforate plate in which some of the perforations or orifices are for gas flow and the remainder are for air flow.
Figure 2:
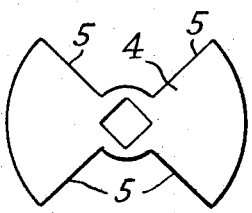
FIGURE 2 shows a closure member for closing the orifices in the plate shown in FIGURE 1 and helping to maintain a constant air-to-gas ratio in different furnace operating conditions.

FIGURE 1 shows a perforate plate 1 in which the orifices or holes are disposed in two oppositely positioned sectors or segments, each sector comprising five gas-flow holes 2 and sixty air-flow holes 3. The holes are cylindrical and are all of the same diameter as one another, so that the relationship between the total air and gas cross-sections is given by the ratio between the air holes and gas holes. In the particular example considered, this ratio is 13. The burner can operate with any kind of gas; all that is necessary is to adapt the hole ratio to the "comburivor" power density and viscosity of the gas used. In order to keep the drawings simple, not all the holes are shown. Each sector can extend over an angle of 80°.

Associated with the perforate plate 1 is a closure member 4 which is coaxial of the plate 1 and whose imperforate parts can close the two sectors simultaneously. The gas holes and air holes are so disposed relative to one another that the proportion between the air flow cross-sections and the gas flow cross-sections remains constant. Edges 5 of the closure member 4 are straight and extend along diameters of the plate 1.

Figure 3:
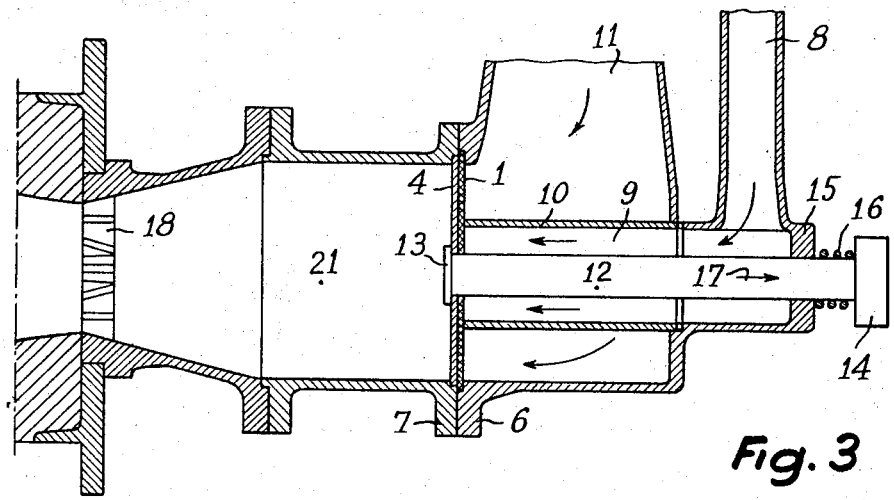
FIGURE 3 is a section through a burner according to the invention, along a plane passing through the burner axis.

FIGURE 3 shows a burner having the perforate plate 1 and closure member 4. The items 1, 4 are retained between two flangelike parts 6, 7. Gas is supplied to the holes 2 through a duct 8 which discharges into a chamber 9 bounded by a cylindrical sheath 10 extending up to and in contact with the plate 1. Air is supplied through a duct 11 whose terminal portion encircles the sheath 10. The duct 11 can therefore supply all the air holes 3 of the plate 1.

The closure member 4 is operated from outside the burner via a shaft 12 whose end 13 is rigidly connected to the closure member 4 and which has an actuating member 14. The shaft 12 extends through wall 15 of the gas supply duct 8, and a spring 16 is provided between the wall 15 and the actuating member 14 so as to apply a pull to the shaft 12 in the direction indicated by an arrow 17 and to keep the closure member 4 firmly engaged with the plate 1. The gas-air mixture enters a mixing chamber 21 before going through the actual burner plate 18.

Of course the burner comprises the various sealing means required and the securing elements for mounting the system and positioning the plate 1 and closure member 4. In order to keep the drawings simple, the securing elements are not shown.

The burner just described is supplied with equal air and gas pressure. Burner operation can be varied just by operating the actuating member 14 with no need to worry about the air-to-gas ratio. Satisfactory mixing occurs at the passage through the plate 1.

Figure 4:
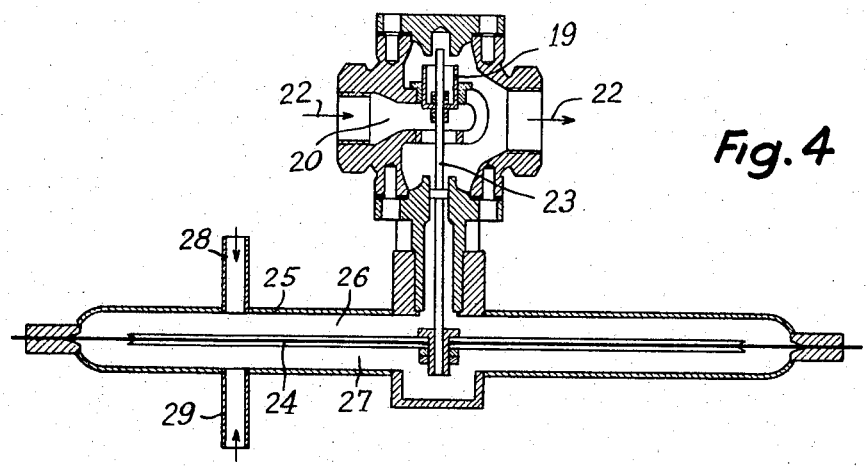
FIGURE 4 is a section through a gas feed monitoring system controlled by the pressure of the burner feed air and equalising gas and air pressures before the gas and air go through the perforate plate shown in FIGURE 1.

If required, the closure member 4 can be left in a position in which all the holes 2, 3 are open, and the air and gas pressures, provided that they stay equal to one another, can be varied simultaneously. A system of the kind shown in FIGURE 4 provides a ready means of keeping the gas and air pressures equal to one another. The system comprises a sliding valve 19 adapted to close a gas passage 20 in a supply duct, the gas flowing in the direction indicated by arrows 22. The valve 19 is so controlled that the gas and air pressures are always equal to one another. To this end, the valve 19 is disposed on a rod 23 connected to an actuating diaphragm 24 disinto two chambers 26, 27. Gas reaches the chamber 26 posed inside a capsule 25 which the diaphragm 24 divides through a duct 28 and chamber 27 is supplied through a duct 29. Duct 28 is connected to the gas flow, and the valve 19 is so secured to the rod 23 that the diaphragm 24 is in the equilibrium position when the gas pressure in the feed duct 28 is equal to the air pressure. The diaphragm 24 takes up a central position in the capsule 25 when the air and gas pressures in the chambers 27 and 26 exactly balance one another. Consequently, a variation just of air pressure automatically causes a corresponding variation of gas pressure.

With the system just described, therefore, either the position of the closure member 4 can be varied, to vary the number of air and gas flow holes, or the holes can be left fully open and the air pressure can be varied, gas pressure staying proportional to air pressure.

The system has the advantage of being very simple and of operating very well and can provide a completely progressive temperature control in a furnace. If required, action on air pressure can be combined with varying the opening of the closure member 4.

Once the air-to-gas ratio has been set up, the change in the number of burners in operation has no effect on adjustment of the ratio, unlike what happens in a system in which the proportions are adjusted by the rates of air and gas flow for a number of burners being measured at one central place.

The invention is not of course limited by details of the embodiment hereinbefore described, and such details can vary without departure from the scope of the invention. For instance, the actuating member 14 can be omitted, more particularly in the case of furnaces having automatic temperature control. In this event, the distributing plate 1 is perforated regularly instead of being perforated just in two zones. Provided that air and gas pressures stay the same, burner heat output is controlled just by varying the values of such pressures.

I claim:

1. A gas burner comprising a gas admission conduit, an air admission conduit concentric with said gas conduit, a valve in said gas conduit, a plate closing said conduits, two series of openings in said plate one of said series passing the gas and the other of said series passing the air, means for actuating said valve by the air pressure in said air conduit for maintaining the gas pressure and the air pressure equal upstream of said plate, the total area of said series of openings for the gas and the total area of said series of openings for the air providing a predetermined constant ratio of the volume of the air to the volume of the gas downstream of said plate and means for adjusting the total volume of gas and air downstream of said plate by simultaneously obturating fractionally equal numbers of openings in said two series of openings.

2. A gas burner as described in claim 1, the openings in said plate being cylindrical and of the same diameter.

References Cited

UNITED STATES PATENTS

| | | |
|---|---|---|
| 320,060 | 6/1885 | Griffen. |
| 1,320,107 | 10/1919 | Werlin _____ 158—119 |
| 1,573,079 | 2/1926 | McKee. |
| 1,812,089 | 6/1931 | Engels. |
| 2,070,969 | 2/1937 | Carroll et al. _____ 158—119 |
| 3,097,073 | 7/1963 | Hildyard et al. ____ 158—119 X |
| 3,229,748 | 11/1966 | Spielman _____ 158—119 X |

FREDERICK L. MATTESON, Jr., *Primary Examiner.*

H. B. RAMEY, *Assistant Examiner.*

UNITED STATES PATENT OFFICE
CERTIFICATE OF CORRECTION

Patent No. 3,371,699                         March 5, 1968

Andre´ Henri Riot

It is hereby certified that error appears in the above numbered patent requiring correction and that the said Letters Patent should read as corrected below.

Column 2, line 64, strike out "posed inside a capsule 25 which the diaphragm 24 divides" and insert the same after "dis-" in line 62, same column 2.

Signed and sealed this 20th day of May 1969.

(SEAL)
Attest:

Edward M. Fletcher, Jr.
Attesting Officer

Commissioner of Patents